Feb. 10, 1931.  J. F. PETERS ET AL  1,792,320
HIGH FREQUENCY TESTING APPARATUS
Filed Jan. 2, 1926
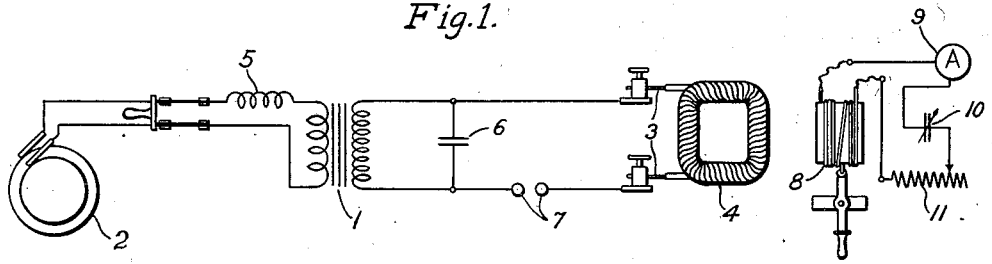
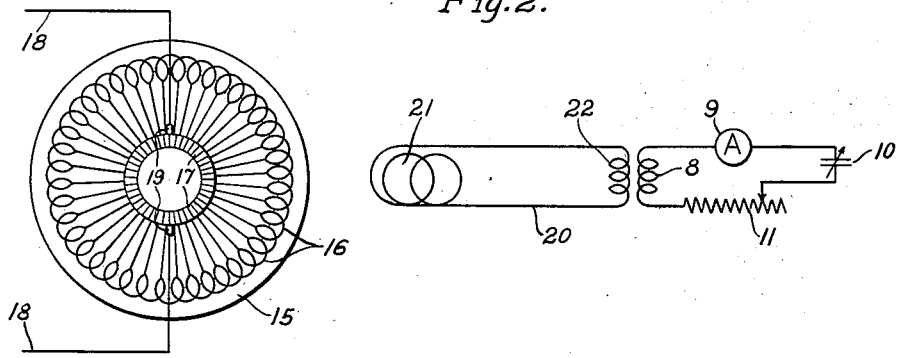
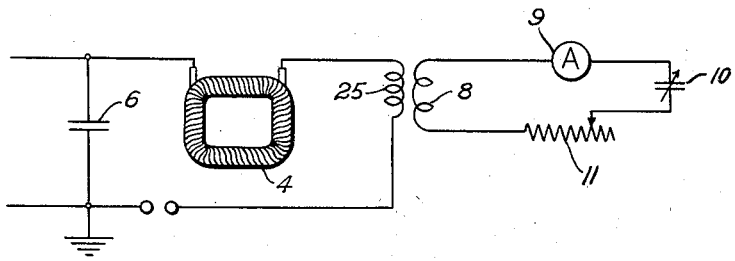
WITNESSES:
INVENTORS
John F. Peters &
John L. Rylander.
BY
ATTORNEY Patented Feb. 10, 1931

1,792,320

UNITED STATES PATENT OFFICE

JOHN F. PETERS, OF EDGEWOOD PARK, AND JOHN L. RYLANDER, OF IRWIN, PENNSYLVANIA, ASSIGNORS TO WESTINGHOUSE ELECTRIC AND MANUFACTURING COMPANY, A CORPORATION OF PENNSYLVANIA

HIGH-FREQUENCY TESTING APPARATUS

Application filed January 2, 1926. Serial No. 78,905.

Our invention relates to a method of, and apparatus for, testing insulated electrical conductors or windings.

An object of our invention is to improve the thoroughness with which insulated conductors or windings may be tested without injuring the insulation during the test by excessive currents at points of failure.

A further object of our invention is to provide sensitive means for indicating the presence of a fault when a high-frequency potential is applied to an insulated winding.

In accordance with our invention, insulated conductors or windings to be tested are subjected to a high-frequency potential usually in excess of the normal operating voltage. The circuit including the winding is preferably a tuned circuit in order that both the magnitude and the oscillation period or frequency of the testing current will vary in the case of a faulty winding by reason of leakage of current between the turns thereof. The variation of current from normal is detected by means of a resonant circuit containing an ammeter or other current-responsive device, the circuit being so related to the winding under test as to receive energy by magnetic induction or radiation or both therefrom.

For a clearer understanding of our invention and of further objects and advantages thereof, reference should be had to the accompanying drawings, in which Figure 1 is a diagrammatic view of testing apparatus embodying the same;

Fig. 2 is a similar view of a modification thereof applied to the windings of a dynamo-electric machine; and Fig. 3 is a similar view of another modification.

Referring to Fig. 1, the testing apparatus comprises a high-potential, single-phase transformer 1 energized by a single-phase alternator 2 and adapted to supply a high-frequency potential to the terminals 3 of a winding 4 under test. A reactor 5 is connected in the primary circuit of the transformer 1 to limit the current through the transformer to a safe value in case the secondary winding is short-circuited by a defective test coil. A condenser 6 is connected across the terminals of the secondary winding of the transformer 1, the winding 4 being connected in series with a spark gap 7 across the terminals of the condenser 6.

The transformer 1 may have a secondary potential of from 2000 to 20,000 volts or more, depending upon the type and voltage rating of the apparatus being tested. The spark gap 7 is so adjusted as to break down at somewhat less than the maximum or peak value of the transformer voltage, thereby permitting the condenser 6 to discharge through the winding 4. The current through the winding 4 is oscillatory in nature and is highly damped on account of the relatively high resistance of the circuit including the spark gap 7 and winding 4. If desired, a high-frequency alternator or other source of undamped high-frequency current connected directly to the terminals of the winding 4 may be employed, although the oscillatory circuit shown is preferred on account of its simplicity, low cost and flexibility or ease of regulation.

An adjustably mounted winding 8 is disposed adjacent to the winding 4 and is connected in series with a current-responsive device, such as a sensitive ammeter 9, a variable condenser 10 and a variable resistor 11. The circuit including the winding 8 and the condenser 10 is adjusted to be in resonance with the high-frequency current traversing the winding 4.

The variable resistor 11 is provided to facilitate the adjustment of the spacing between the windings 4 and 8 for a desired indication upon the ammeter 9. A considerable resistance is initially connected in circuit and the windings 4 and 8 disposed in close proximity to each other. The condenser 10 is then adjusted until the maximum indication of the ammeter 9 shows that the circuits containing the windings 4 and 8 are in resonance. The winding 8 is then moved away from the winding 4 and the resistance 11 is gradually reduced thereby increasing the sharpness of tuning in the coupled circuit. The adjustment is continued in this manner until the resistance 11 is entirely removed from the circuit and the winding 8 is so related to the winding 4 that the current in the coupled circuit causes approximately a full-scale deflection of the ammeter 9.

Under these conditions, the magnitude and frequency of the oscillatory current through the winding 4 under test depend upon the dimensions and insulation of the winding. If the insulation of the winding breaks down or if a defective winding is connected to the test circuit, the deflection of the instrument 9, instead of being approximately full-scale, is reduced in magnitude, sometimes becoming almost inappreciable. The decrease of current in the coupled circuit may result either from the detuning of the circuits, the change of current in the winding 4, or from both conditions.

It will be seen therefore that the method comprises applying a high-frequency current to the winding under test and detecting a variation in the current by means of a resonant circuit of small decrement. The use of a high-frequency test potential prevents a severe burning or injury of the insulation of the winding 4 in case a break-down occurs, which would prevent the cause and the exact location of the fault from being ascertained. Furthermore, the use of a resonant circuit of low decrement provides a sensitive fault-detecting means which is responsive to faults of an exceedingly minute character which could not be discovered by ordinary measuring devices, but which might develop into serious faults under the heat and stress of prolonged service.

It will be noted that the method comprises in reality a comparison of the characteristics of a plurality of similar windings instead of an exact measurement of the characteristics of a single winding. The main application of the invention is, therefore, to be found in the routine testing of such windings as form-wound coils for dynamo-electric machines or induction apparatus which are manufactured in large quantities and are of similar dimensions. In the case of such coils, some will be found satisfactory and these may be used as a basis of comparison, as the defective coils will provide a widely different indication upon the test instrument 9.

The transfer of energy between the windings 4 and 8 takes place both by the radiation of energy from the winding 4 and by the magnetic induction between the two windings. When the windings are in close proximity to each other, the greater proportion of the energy transferred is that contained in the magnetic field, which is so large that a thermo-couple ammeter may be employed in the coupled circuit. However, if a more sensitive current-responsive device is employed, the apparatus may be so arranged if desired, as to be operated almost entirely by radiated energy.

The invention may be applied to the testing of windings in partially or completely assembled machines, even where the windings are disposed upon an iron core member. In Fig. 2 is shown the application of the invention to the testing of the windings of an armature 15 of a direct-current motor. The armature 15 comprises a plurality of coils 16 connected to the respective commutator segments 17. The high-frequency test potential may be applied to the armature windings through the conductors 18 and brushes 19 co-operating with the commutator segments 17.

The resonant detector circuit need not be coupled directly to the winding under test. As shown in this figure, an intermediate circuit 20 is disposed between the winding 8 and the winding under test, the circuit 20 comprising a winding 21 adjacent to the armature 15 and a winding 22 inductively coupled to the winding 8. The operation of the apparatus is substantially the same as that shown in Fig. 1. Although a plurality of armature windings are connected to each of the commutator segments, after a little practice, an operator is able to locate the defective winding in the armature by means of the relative positions of the armature winding and the exploring winding 21.

A further modification of the invention is shown in Fig. 3 in which the winding 4 being tested is connected in series with a coil 25 to which the winding 8 is inductively coupled. The operation of the apparatus shown in this figure is similar to that shown in Fig. 1. The circuit including the winding 4, is traversed by a damped oscillatory current, of which the frequency depends upon the characteristics of the windings 4 and 25 and the capacity of the condenser 6. The detector circuit including the winding 8 is tuned to the same frequency and therefore indicates a defective winding 4 by the altered deflection of the instrument 9.

It will be apparent that the method of testing described above is adapted to the testing of windings in large quantities rapidly and expeditiously. Although the applied potential may be greater than the normal potential for which the windings are designed, a fault in the insulation will not materially damage the winding because of the limiting character of the supply circuit. Furthermore, it has been found in practice that many slight insulation defects are detected by this method of testing which could not be discovered by any previous method.

The use of the method described in actual practice has resulted in a more uniform and satisfactory grade of insulation of windings and has effected considerable economy by bringing out the fact that certain portions of the windings were provided with too much insulation or too little insulation with respect to the remainder of the windings. Many other advantages of the improved testing apparatus will be apparent to those skilled in the art and the above are only mentioned by way of example.

We do not consider that the invention is limited to the apparatus and the arrangement thereof shown and described in detail. Consequently we desire that the invention should not be limited in scope except as may be indicated in the appended claims.

We claim as our invention:

1. The method of testing a winding in position in an electrical translating device which consists in impressing a high-frequency voltage upon the winding and subjecting a second winding to the electro-magnetic influence of the first winding, adjusting the constants of a circuit including the second winding to render the circuit resonant to the frequency of the impressed voltage, and observing the value of the current traversing said circuit when so adjusted.

2. In an electrical device comprising one or more insulated windings, means for testing the insulation of said windings in assembled position comprising means for impressing a high-frequency potential on said windings in sequence, and means for receiving the energy radiated from said winding and for indicating the magnitude thereof.

3. In an electrical device comprising a plurality of insulated windings, means for testing the insulation of said windings in assembled position comprising means for impressing a high-frequency potential on said windings, and a circuit for receiving and indicating the magnitude of energy radiated from said winding and including a coil adapted to be moved with respect to said electrical device into energy-receiving relation with respect to said windings.

4. Means for testing the insulation of electrical conductors in assembled electrical apparatus comprising means for energizing a conductor with high-frequency current, a circuit tuned to the frequency of the current traversing said conductor including a winding movable with respect to said conductor and energized in accordance with the energy radiating therefrom, and an electrical indicating instrument in said circuit.

5. Means for testing the insulation of the windings in assembled electrical apparatus comprising a source of high-frequency current directly connected to a winding, and means comprising a circuit tuned with respect to said source and including a coil adapted to be moved with respect to said winding for receiving the energy radiated from said winding.

In testimony whereof we have hereunto subscribed our names this 29th day of December, 1925.

JOHN F. PETERS.
JOHN L. RYLANDER.